No. 657,787. Patented Sept. 11, 1900.
R. B. PRICE.
RUBBER VEHICLE TIRE.
(Application filed Apr. 9, 1900.)
(No Model.)
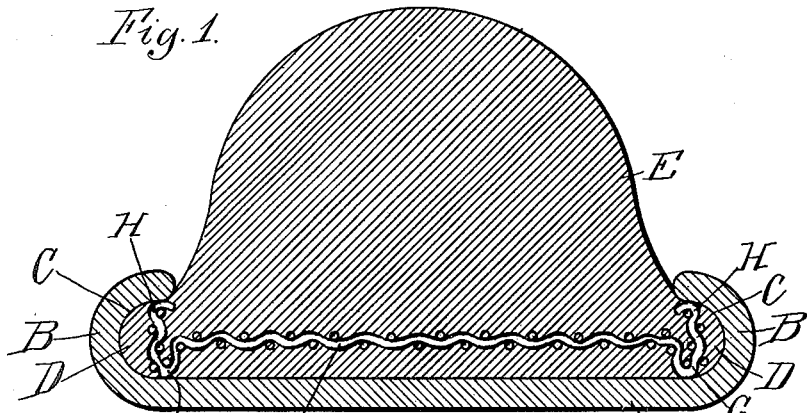
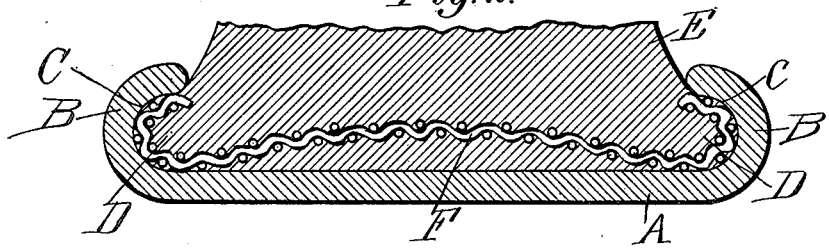
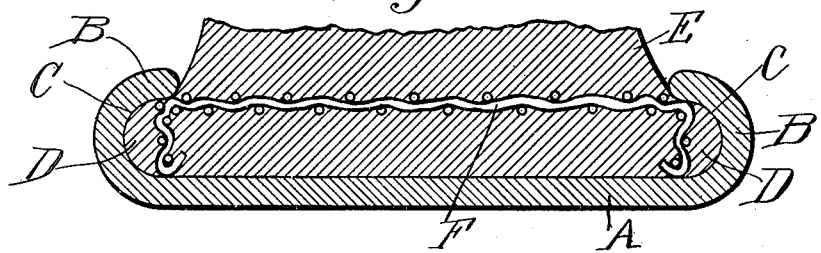
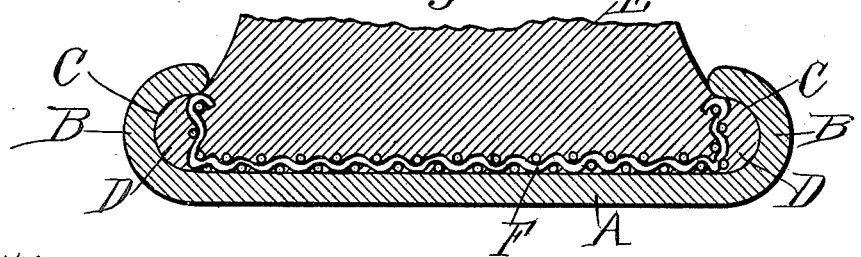
Witnesses:
Wm B. Snowhook
Arthur C. Lot
Inventor:
Raymond B. Price
By Rudolph
Atty

UNITED STATES PATENT OFFICE.

RAYMOND B. PRICE, OF CHICAGO, ILLINOIS, ASSIGNOR TO THE CALUMET TIRE RUBBER COMPANY, OF SAME PLACE.

RUBBER VEHICLE-TIRE.

SPECIFICATION forming part of Letters Patent No. 657,787, dated September 11, 1900.

Application filed April 9, 1900. Serial No. 12,141. (No model.)

*To all whom it may concern:*

Be it known that I, RAYMOND B. PRICE, a citizen of the United States, residing at Chicago, in the county of Cook and State of Illinois, have invented certain new and useful Improvements in Rubber Vehicle-Tires; and I do hereby declare the following to be a full, clear, and exact description of the invention, such as will enable others skilled in the art to which it appertains to make and use the same.

My invention relates to a novel construction in a vehicle-tire, the object being to provide a tire which cannot spring out of its rim and which will not tear transversely; and it consists in the features of construction and combinations of parts hereinafter fully described and claimed.

In the accompanying drawings, illustrating my invention, Figure 1 is a transverse section of a tire constructed in accordance with my invention. Figs. 2, 3, and 4 are similar sections showing modifications in construction.

In the construction of rubber vehicle-tires the greatest problem has been to construct a tire which will under no conditions spring out of its retaining-rim. To this end numerous devices have been constructed, some of which have met with some success. The greatest number of such devices include an annular interior fastening-strip, but some attempts have been made in other directions. The general experience has been that the tire will compress laterally and spring out of its rim or the fastening-band will break or the tire will tear laterally, thus separating the tread portion from the base. The lateral compression is obviously due to insufficient stiffening of the base, and the tearing action is due to chafing between the edges of the rim or retaining-band and the rubber immediately above the base, thus starting a fracture, which increases rapidly with lateral strains to which the tires are subjected. In my present device my invention relates particularly to the manner of stiffening the base, whereby the difficulties last referred to are overcome.

To this end my tire consists, primarily, of a rim A, provided on its side edges with annular overhanging flanges B, adapted to form annular grooves C to receive the flanges D of the rubber tire E. The said rim is of an old and well-known form. The said flanges D of said rubber tire E are located on each side of the base, the latter being contained between said flanges B of the rim. Said flanges D of said rubber tire E fit very snugly within said grooves C of the rim, and the width of the tire across the base is preferably so proportioned to the greatest width of the rim as to effect a very tight fit between the same. In order to prevent said tire from springing out of said rim, it is obviously necessary that its base be so stiffened as to render lateral compression thereof impossible. It is also necessary that the flanges of the tire be so stiffened as to prevent them from bending relatively to the tire at any point. At the same time to avoid chafing between the base portion of the tire and the overhanging flanges of the rim the portions of the tire contained within the rim must remain rigid under any load upon the tire— that is, the movement (compression and expansion) of the rubber must be confined to the tread portion of the tire and must be particularly avoided in the flanges. The chafing referred to takes place particularly where the edges of the flanges of the rim come into contact with the tire, just above the base portion of the latter, and the greater the movement of the tire at this point the greater will be such chafing. My said tire is stiffened, preferably, by intermolding in the base thereof an annular strip F of wire-cloth made of the heaviest wire consistent with the size of the tire. In cross-section the said strip F is preferably bent to resemble an I-beam; but this form may be varied without departing from my invention. The formation to this shape is effected by bending the edge portions of the strip to form flanges and then bending said flanges over upon each other or folding them so that they project beyond both faces of the strip and form a double or reinforced flange G on one side and a single flange H on the other side. The combined width of said flanges G and H is equal to the radial height of the overhanging grooves C and when in place engage what I term the "top" and "bottom" of each of said grooves C, the width of the web being such that said flanges G and H enter said grooves C. The said flanges G and H are contained within the flanges D of the tire E and are visible at points on the surface of flanges, while the web portion of the strip extends laterally through about the middle of the base, there being enough rubber below the same to afford an excellent hold for the base thereon, and thereby preventing the base from tearing away from said strip. Thus when said tire is in place in the rim the metal flanges G and H are in contact with the metal of the rim and receive all the wear, besides rendering the flanges so stiff that their resiliency is destroyed, so that they serve only to fill out the grooves C and to hold the rubber against tearing away from the stiffening. At the same time the web portion of the stiffening-strip, which is again stiffened and reinforced by the surrounding rubber, serves to absolutely prevent lateral compression of the base. In this manner all the strain and wear are borne by the metal stiffening-strip.

In Fig. 2 I have shown a modified shape of stiffening-strip, the side edges of which are bent to conform to the shape of the flanges of the rim and which practically form an outer lining for the flanges of the tire. The web portion of said strip is preferably curved, so as to lie deep within the base of the tire, thereby giving the latter a better hold thereon.

In Figs. 3 and 4 I have shown the stiffening-strip shaped like a channel-bar, said strip being intermolded either in an inverted position, as shown in Fig. 3, with its flanges extending inwardly, or, as shown in Fig. 4, with its flanges extending outwardly.

All of the last-named constructions will serve the desired purpose, my invention consisting, broadly, in providing a stiffening-strip which while stiffening the tire laterally also projects from those parts of the surface at which the greatest strains and wear are felt and which bears such strains and wear, thus relieving the rubber thereof and increasing the life of the tire, and thereby distributing the wearing load over the entire base of the tire.

I claim as my invention—

1. In a vehicle-tire, the combination with a rim provided with annular overhanging flanges on its side edges, adapted to form annular grooves, of a tire provided at the sides of its base portion with annular flanges adapted to fit within said grooves, and a foraminated stiffening-strip intermolded in said base portion of said tire and provided with annular flanges at its side edges extending into said flanges of said tire and extending to the surface of said flanges at a plurality of points, said flanges of said stiffening-strip being adapted to engage the flanges of the rim and assume the strains and wear to which said flanges of said tire are subjected.

2. In a vehicle-tire, the combination with a rim provided with annular overhanging flanges on its side edges, adapted to form annular grooves, of a tire provided at the sides of its base portion with annular flanges adapted to fit within said grooves, and a lateral foraminated metal stiffening-strip intermolded in the base portion of said tire and extending into the flanges thereof and provided at its edges with flanges located within the flanges of said tire and extending to the surface of the latter at a plurality of points, whereby said flanges of said stiffening-strip are brought into direct engagement with the flanges of said rim and assume the strains and wear to which the flanges of the said tire are otherwise subjected.

3. In a vehicle-tire, the combination with a rim provided with annular overhanging flanges on its side edges, adapted to form annular grooves, of a tire provided at the sides of its base portion with annular flanges adapted to fit within said grooves, and a lateral foraminated stiffening-strip intermolded in said base portion of said tire and extending into the flanges thereof and provided with flanges within the flanges of said tire, said flanges of said stiffening-strip being adapted to extend to the surface of said flanges adjacent their points of connection with said base and at top and bottom of said flanges, whereby said flanges of said stiffening-strip are brought into direct contact with the flanges of the rim and engage the same to relieve the flanges of the tire of strain and wear.

4. In a vehicle-tire, the combination with a rim provided with annular overhanging flanges on its side edges, adapted to form annular grooves, of a tire provided at the sides of its base portion with annular flanges adapted to fit within said grooves, and a lateral foraminated metal stiffening-strip intermolded in the base of said tire and extending into the flanges thereof, said stiffening-strip being provided at its edges with flanges and with its flanges resembling an I-beam in shape, said flanges extending to the top and bottom faces of said flanges of the tire and adapted to engage the flanges of the rim.

5. In a vehicle-tire, the combination with a rim provided with annular overhanging flanges on its side edges, adapted to form annular grooves, of a tire provided at the sides of its base portion with annular flanges adapted to fit within said grooves, and a lateral foraminated metal stiffening-strip intermolded in the base of said tire and extending into the flanges thereof, said stiffening-strip being provided at its edges with flanges folded over upon themselves and projecting beyond both faces of the strip, thus giving said strip an I-beam shape in cross-section, the flanges thereof extending to the top and bottom faces of the flanges and adapted to directly engage said flanges of said rim.

In testimony whereof I affix my signature in presence of two witnesses.

RAYMOND B. PRICE.

Witnesses:
RUDOLPH WM. LOTZ,
WM. D. MCJENNETT.